(12) United States Patent
Yashiki

(10) Patent No.: US 9,354,364 B2
(45) Date of Patent: May 31, 2016

(54) COLORING FORGERY PREVENTION STRUCTURE AND COLORING FORGERY PREVENTION MEDIUM

(71) Applicant: TOPPAN PRINTING CO., LTD., Tokyo (JP)

(72) Inventor: Kazuhiro Yashiki, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 14/087,838

(22) Filed: Nov. 22, 2013

(65) Prior Publication Data

US 2014/0077487 A1    Mar. 20, 2014

Related U.S. Application Data

(63) Continuation of application No. PCT/JP2012/063338, filed on May 24, 2012.

(30) Foreign Application Priority Data

May 25, 2011    (JP) .................................. 2011-116827

(51) Int. Cl.
*B42D 25/445* (2014.01)
*B42D 25/324* (2014.01)
*B42D 25/373* (2014.01)
(Continued)

(52) U.S. Cl.
CPC .............. *G02B 5/1828* (2013.01); *B42D 25/29* (2014.10); *B42D 25/373* (2014.10); *B42D 25/445* (2014.10); *G02B 5/1852* (2013.01); *G03H 1/0011* (2013.01); *G03H 1/0244* (2013.01); *G03H 1/0256* (2013.01); *B42D 25/324* (2014.10); *B42D 25/328* (2014.10); *B42D 25/45* (2014.10); *B42D 2033/18* (2013.01); *B42D 2035/24* (2013.01); *G03H 1/0236* (2013.01); *G03H 2250/34* (2013.01); *G03H 2250/36* (2013.01)

(58) Field of Classification Search
CPC ... B42D 25/445; B42D 25/324; B42D 25/373
See application file for complete search history.

(56) References Cited

U.S. PATENT DOCUMENTS

| 5,128,779 | A | 7/1992 | Mallik | |
|---|---|---|---|---|
| 8,603,615 | B2 * | 12/2013 | Keller | 283/72 |

(Continued)

FOREIGN PATENT DOCUMENTS

| JP | 2524092 | 1/1997 |
|---|---|---|
| JP | 4088884 | 5/2008 |

(Continued)

OTHER PUBLICATIONS

JP 2009-63703 Translation (Mar. 2009).*

(Continued)

*Primary Examiner* — Kyle Grabowski

(57) ABSTRACT

A forgery prevention structure configured by layering at least a relief forming layer, a first reflection layer, a functional thin film layer, and a second reflection layer, in this order, wherein the relief forming layer has, on one side, a relief structure which has an effect of diffracting, scattering, absorbing, and polarizing/separating at least a part of a wave-length range of visible light; the first reflection layer and the functional thin film layer are provided along a whole surface of an uneven area of the relief structure; the second reflection layer is provided in an arbitrary area which covers a part of the uneven area of the relief structure.

9 Claims, 3 Drawing Sheets

(51) Int. Cl.
*G02B 5/18* (2006.01)
*G03H 1/00* (2006.01)
*B42D 25/29* (2014.01)
*G03H 1/02* (2006.01)
*B42D 25/45* (2014.01)
*B42D 25/328* (2014.01)

(56) References Cited

U.S. PATENT DOCUMENTS

| | | | |
|---|---|---|---|
| 2003/0058491 A1 | 3/2003 | Holmes et al. | |
| 2006/0077496 A1 | 4/2006 | Argoitia et al. | |
| 2007/0273142 A1* | 11/2007 | Tompkin et al. | 283/72 |
| 2010/0196587 A1 | 8/2010 | Keller | |
| 2011/0095518 A1* | 4/2011 | Hoffmuller et al. | 283/85 |

FOREIGN PATENT DOCUMENTS

| | | | |
|---|---|---|---|
| JP | 2008-162260 | | 7/2008 |
| JP | 4194073 | | 12/2008 |
| JP | 2009-63703 | | 3/2009 |
| JP | 2009-86192 | | 4/2009 |
| JP | 2010-99929 | | 5/2010 |
| JP | 2010-175812 | | 8/2010 |
| WO | WO01/03945 | * | 1/2001 |
| WO | WO 2010/147185 | | 12/2010 |

OTHER PUBLICATIONS

PCT International Preliminary Report on Patentability mailed Dec. 5, 2013 in corresponding International Application No. PCT/JP2012/063338.
Patent Examination Report No. 1 issued on May 19, 2014 in corresponding Australian Patent Application No. 2012259820.
Australian Patent Examination Report No. 2 issued Feb. 2, 2015 in corresponding Australian Patent Application No. 2012259820.
International Search Report mailed Aug. 20, 2012 in corresponding International Application No. PCT/JP2012/063338.
Extended European Search Report dated May 12, 2015 in corresponding European Patent Application No. 12788957.4.

* cited by examiner

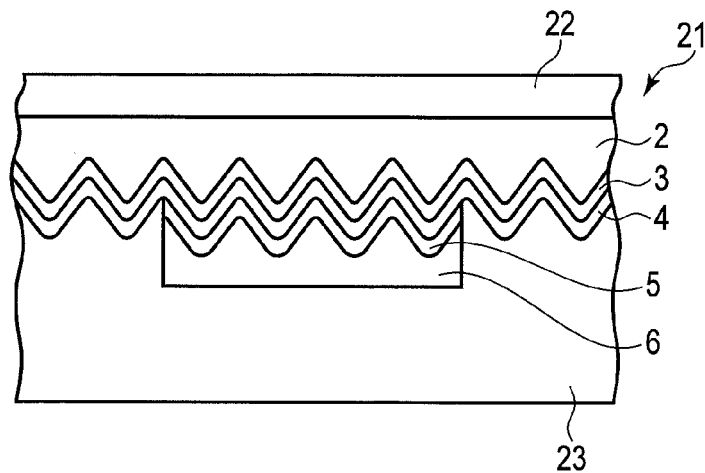
F I G. 3
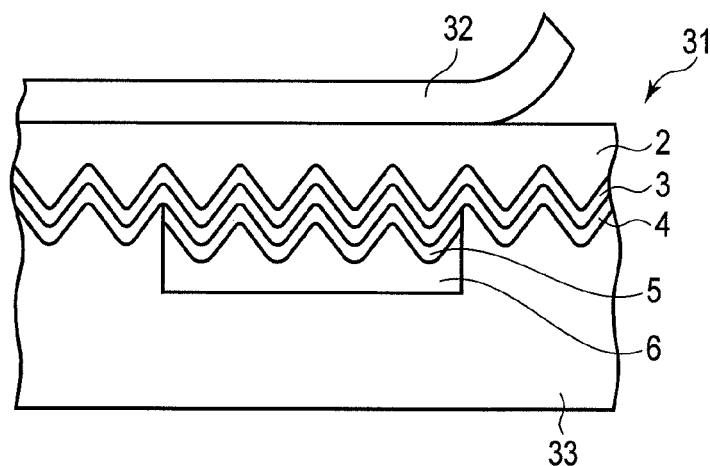
F I G. 4
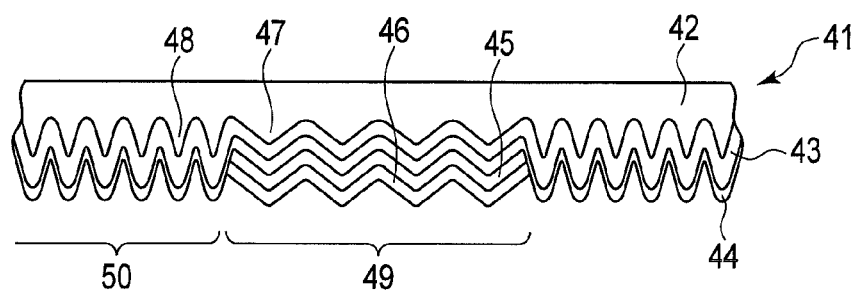
F I G. 5

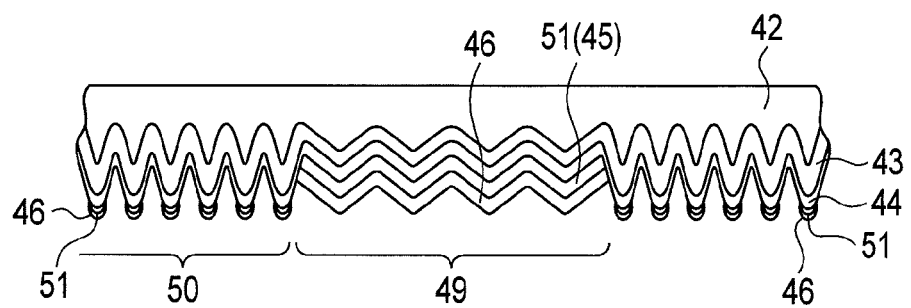
F I G. 6
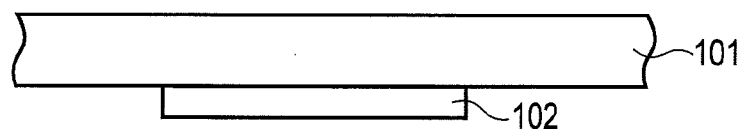
F I G. 7A
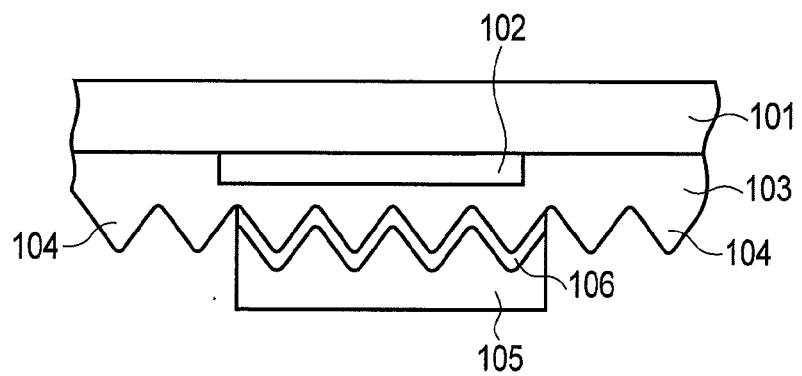
F I G. 7B

COLORING FORGERY PREVENTION STRUCTURE AND COLORING FORGERY PREVENTION MEDIUM

CROSS-REFERENCE TO RELATED APPLICATIONS

This application is a Continuation Application of PCT Application No. PCT/JP2012/063338 filed on May 24, 2012, and is based upon and claiming the benefit of foreign priority from Japanese Patent Application No. 2011-116827, filed on May 25, 2011, the entire contents of which are incorporated herein by reference.

BACKGROUND OF THE INVENTION

The present invention relates to a colored forgery prevention structure and a colored forgery prevention medium which exhibit a high forgery prevention effect and a high alteration prevention effect.

A forgery prevention structure is used to prevent forgery of valuable papers, brand-name products, certificates, and personal authentication media, and functions to prove articles to be genuine.

In recent years, a forgery prevention structure using an optical element such as a diffraction grating or a hologram is applied to various articles because a special optical effect thereof can be distinguished at a glance. A lot of optical elements include a micro structure, such as a diffraction grating, a hologram, or a lens array. These micro structures are difficult to analyze. In addition, an optical element including a micro structure is manufactured using an electron-beam lithography apparatus, and can therefore exhibit an excellent forgery prevention effect.

However, a hologram which has a silver metallic luster has been widely marketed for a packaging purpose and an amusement purpose. Therefore, the security thereof is deteriorating. To respond to these circumstances, for example, Patent Literature 1 proposes a hologram which partially comprises a reflection layer, as a hologram which provides a forgery prevention effect. The hologram which includes a reflection layer having a micro pattern is considered difficult to counterfeit.

On the other hand, a proposal has been made for a hologram which has a metallic luster in a vivid color tone other than silver. For example, Patent Literature 1 proposes a hologram structure with which a desired color tone is obtained and which is excellent in design and/or security. Color tones can be more or less chosen by using this method. However, the reflectance of a high-intensity ink layer is lower than that of a vapor-deposited film of aluminum and has a tendency to scatter. Therefore, there is a defect that a colored metallic luster, e.g., a metal luster of a vivid color tone such as gold or copper is not obtained.

Further, a partially colored reflection layer is difficult to provide on a hologram through the method according to Patent Literature 1. This defect is caused by the difficulty in overprinting a reflection layer of a high-luminance ink in an identical pattern over a colored layer with high positional accuracy, after pattern-printing of the colored layer.

Another method has been considered in which a vivid color reflection layer is formed of gold or copper by a vacuum deposition method or a sputtering method, and patterned by etching. However, forming a precious-metal reflection layer by etching requires high costs and exhibits low productivity.

CITATION LIST

Patent Literature

Patent Literature 1: Jpn. Pat. Appln. KOKAI Publication No. 2008-162260

BRIEF SUMMARY OF THE INVENTION

An object of the invention is to provide a forgery prevention structure which is excellent in design and/or security.

According to the first aspect of the invention, there is provided a forgery prevention structure configured by layering a first reflection layer, a functional thin film layer, a second reflection layer, and a protection layer, in this order, characterized in that:

the relief forming layer has, on one side, a relief structure which has an effect of diffracting, scattering, absorbing, and polarizing/separating at least a part of a wave-length range of visible light;

the first reflection layer and the functional thin film layer are provided along a whole surface of an uneven area of the relief structure;

the second reflection layer is provided in an arbitrary area which covers a part of an uneven area of the relief structure;

the protection layer is provided so as to cover only an area of the second reflection layer; and three layers of the first reflection layer, the functional thin film layer, and the second reflection layer cause at least a partial range of visible light to interfere.

According to the second aspect of the invention, there is provided a forgery prevention structure configured by layering a first reflection layer, a functional thin film layer, a second reflection layer, and a protection layer, in this order, characterized in that:

the relief forming layer has, on one side, a relief structure including a first relief and a second relief which performs an effect of diffracting, scattering, absorbing, and polarizing/separating a wavelength range of at least a part of visible light;

the surface of the first relief has a smaller uneven surface area in comparison with the surface of the second relief;

the first reflection layer and the above functional thin film layer are provided along a whole surface of an uneven area of the relief structure; and the second reflection layer and the protection layer are provided so as to cover only a surface of the functional thin film layer of the first relief; and three layers of the first reflection layer, the functional thin film layer, and the second reflection layer cause at least a partial range of visible light to interfere.

According to the third aspect of the invention, there is provided the forgery prevention structure according to claim 1 or 2, characterized in that the first reflection layer includes at least one selected from a group of tantalum oxide, niobium oxide, titanium oxide, indium oxide tin, zirconium oxide, cerium oxide, and hafnium oxide, in the first or second aspect.

According to the fourth aspect of the invention, there is provided a forgery prevention structure characterized by forming the first reflection layer of a high-intensity transparent reflection paint which is made of high refraction particles, in any one of the first to third aspects.

According to the fifth aspect of the invention, there is provided a forgery prevention structure characterized in that the relief structure includes at least one of a diffraction structure, a hologram, a convergence lens array, a diffusion lens array, and a scattering structure at least partially on an identical plane, in any one of the first to fourth aspects.

According to the sixth aspect of the invention, there is provided a forgery prevention structure layered at least on the substrate, and the forgery prevention structure is characterized by being a sticker configuration which layers a relief forming layer, a first reflection layer, a functional thin film layer, a second reflection layer, a protection layer, and an adhesion layer, in this order on the substrate, in any one of the first to five aspects.

According to the seventh aspect of the invention, there is provided a forgery prevention structure layered at least on the substrate, and the prevention structure is characterized by being a sticker transfer foil configuration which layers a relief forming layer, a first reflection layer, a functional thin film layer, a second reflection layer, a protection layer, and an adhesion layer, in this order on the substrate, and which can be separated from the substrate, in any one of the first to five aspects.

In the foregoing seventh and eighth aspects, a separation protection layer may be provided between the substrate and the relief forming layer, if needed. The separation protection layer is to achieve smooth and stable separation from the substrate, and a material having an excellent mold-release characteristic relative to the substrate may be selected.

According to the eighth aspect of the invention, there is provided a forgery prevention medium to which the forgery prevention structure in any one of the first to seventh aspects is adhered.

According to the invention, a forgery prevention structure can be provided which is excellent in design and/or security.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 3 is a sectional view showing another example of the forgery prevention structure according to the first embodiment;

FIG. 4 is a sectional view showing still another example of the forgery prevention structure according to the first embodiment;

FIG. 5 is a sectional view showing a forgery prevention structure according to the second embodiment;

FIG. 6 is a sectional view showing a process of manufacturing a forgery prevention structure according to the second embodiment;

FIG. 7A is a sectional view showing a process of manufacturing a forgery prevention structure according to Comparative Example 1; and FIG. 7B is a sectional view showing a process of manufacturing the forgery prevention structure according to the Comparative Example 1.

DETAILED DESCRIPTION OF THE INVENTION

First Embodiment

Figure 1:
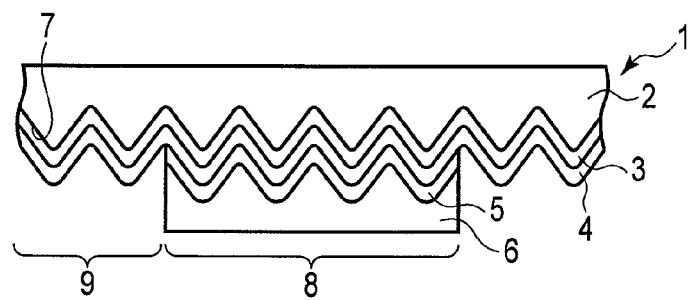
FIG. 1 is a sectional view showing a forgery prevention structure according to the first embodiment.

Hereinafter, a forgery prevention structure according to the first embodiment of the invention will be described with reference to the drawings. FIG. 1 is a sectional view showing the forgery prevention structure according to the first embodiment.

The forgery prevention structure 1 comprises a relief forming layer 2, a first reflection layer 3, a functional thin film layer 4, a second reflection layer 5, and a protection layer 6 which are layered in this order. The relief forming layer 2 has, on one side, a relief structure 7 having a micro uneven pattern. The relief structure 7 has an effect of diffracting, scattering, absorbing, and polarizing/separating at least a part of a wavelength range of visible light. The first reflection layer 3 and the functional thin film layer 4 are provided along a whole surface of an uneven area of the relief structure 7. In an arbitrary area (first area) 8 of the relief structure 7, the second reflection layer 5 is provided covering a part of an uneven area of the relief structure 7. The protection layer 6 is provided so as to cover only the second reflection layer 5.

In the first area 8, the first reflection layer 3, the functional thin film layer 4, the second reflection layer 5, and the protection layer 6 are layered in this order, and a colored reflection layer is obtained which makes three layers of the first reflection layer 3, the functional thin film layer 4, and the second reflection layer 5 cause interference in at least a partial range of visible light. The three layers allow a relief structure to be designed to be capable of forming a reflection layer which causes a color tone to change in accordance with view angles and has a vivid color reflection layer.

The colored reflection layer exists only in the part of the first area 8, and only the patterned second reflection layer 5 is colored. In the first area 8, the patterned second reflection layer 5 is colored in itself. As a result, the second reflection layer 5 is a colored pattern in itself, and therefore, the coloring ink is patterned and printed. Accordingly, it is possible to avoid positional misalignment which may be caused between a colored pattern and a reflection layer 5 by employing a conventional method of forming the reflection layer to be aligned with the colored pattern.

The second area 9 includes neither the second reflection layer 5 nor the protection layer 6 but is formed of the first reflection layer 3 and the functional thin film layer 4. Therefore, also in the second area 9, a colorless optical effect owing to a relief structure can be obtained.

A typical theory concerning a three-layer interference film is described in Jpn. Pat. Appln. KOKAI Publication No. 2010-175812. This patent publication describes a multi-layer interference film including three or more layers. In contrast, the forgery prevention structure according to the first embodiment is limited to a three-layer interference film. That is, there is an advantage that reflection of the interference color can be enhanced as the total number of reflection layers increases. However, in this case, there is a problem that coloring occurs because at least two reflection layers exist also in the second area where the reflection layer of the top layer does not exist. That is, in a multi-layer film of five or more layers, similar interference colors appear in a part (first area) including a high diffraction reflection layer in an uppermost layer and a part (second area) not including the same. Therefore, if a multi-layer film of five or more layers is applied to the forgery prevention structure according to the first embodiment, the first area 8 and the second area 9 tend to have similar color tones.

In the forgery prevention structure according to the first embodiment, the part (first area 8) including the second reflection layer 5 is colored by interference while the part (second area 9) not including the second reflection layer 5 causes no interference and becomes colorless. Accordingly, sufficient difference in color tone can appear between the first area 8 and the second area 9.

Therefore, the forgery prevention structure according to the first embodiment can exhibit a high forgery prevention effect by the colored reflection relief structure in the first area 8 and by the colorless reflection relief in the second area 9.

Next, a method of manufacturing a forgery prevention structure according to the first embodiment will be described with reference to FIG. 2A to FIG. 2C.

First Process

Figure 2A:
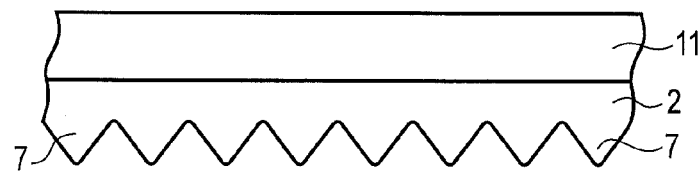
FIG. 2A is a sectional view showing a process of manufacturing a forgery prevention structure according to the first embodiment.

As shown in FIG. 2A, a relief forming layer 2 is formed on the whole surface of a substrate 11. The relief forming layer 2 can be formed by coating, e.g., by wet coating on the substrate 11. In addition, the substrate itself may serve as a relief forming layer.

Subsequently, an original relief plate made of metal or resin and having an uneven shape is prepared. The uneven shape of the original relief plate is transferred to a surface of the relief forming layer 2, to form a relief structure 7 having an uneven surface in the relief forming layer 2 (see the same FIG. 2A).

The method of transfer may be a well-known method such as a press method, a casting method, or a photopolymer method, or a hybrid method which combines any of these methods.

Second Process

Figure 2B:
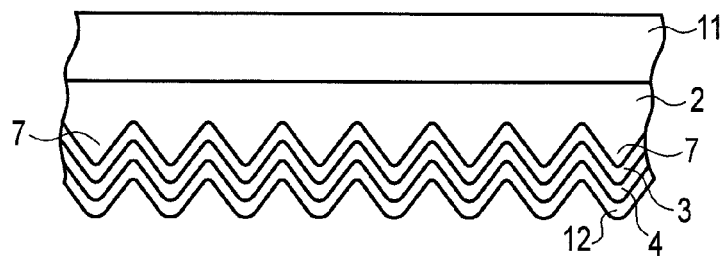
FIG. 2B is a sectional view showing a process of manufacturing a forgery prevention structure according to the first embodiment.
Figure 2C:
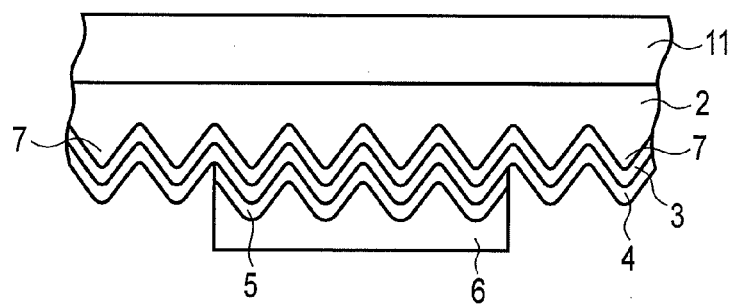
FIG. 2C is a sectional view showing a process of manufacturing a forgery prevention structure according to the first embodiment.

As shown in FIG. 2B, a first reflection layer 3, a functional thin film layer 4, and a thin film layer 12 for a second reflection layer are formed in this order on a surface of the relief structure 7.

The first reflection layer 3 and the functional thin film layer 4 can be formed by well-known wet coating or dry coating. The thin film layer 12 for the second reflection layer can be formed by dry coating, preferably.

Third Process

A protection layer 6 which functions as an etching mask is formed on the thin film layer 12 for the second reflection layer. Subsequently, the thin film layer 12 for the second reflection layers is selectively removed by etching with an etching treatment agent, with the protection layer 6 used as a mask, to form the second reflection layer 5. That is, the thin film layer 12 for the second reflection layer is left to remain in an area under an area (first area 8) of the protection layer 6, as the second reflection film 5. The thin film layer 12 for the second reflection layer is removed from under the other areas (second area 9). Here, the first reflection layer 3 need not be removed by etching.

Specifically, the thin film layer 12 for the second reflection layer is formed on the whole surface of the functional thin film layer 4, and thereafter, a protection layer 6 is formed on the thin film layer 12 for the second reflection layer by a well-known wet printing method. Thereafter, the thin film layer 12 for the second reflection layer is selectively subjected to etching with the protection layer 6 used as an etching mask, to form a patterned second reflection layer 5.

The forgery prevention structure according to the first embodiment is manufactured through the first to third processes above, but is not limited thereto.

Next, more detailed descriptions will be made of materials, required characteristics, and specific manufacturing methods of layers forming the forgery prevention structure according to the first embodiment.

Substrate

The substrate used in the manufacturing method described above is preferably a film substrate. As the film substrate, a material which is less deformed or degraded by heat, pressure, and electromagnetic waves which are applied during formation of a micro uneven pattern (relief structure) is used. A film made of plastic, such as PET (polyethylene terephthalate), PEN (polyethylene naphthalate), or PP (polypropylene), may be used for the film substrate. Depending on necessity, a paper made of multiple plastic layers or a paper impregnated with resin may be used as a substrate.

Relief Forming Layer

On a surface of the relief forming layer, a relief structure which has a micro uneven pattern is preferably copied sequentially a great number of times. As a typical method, the "press method" described in U.S. Pat. No. 4,194,073, the "casting method" described in Utility Model Registration No. 2524092, or the "photopolymer method" described in U.S. Pat. No. 4,088,884 can be employed.

Particularly in the "photopolymer method" (2P method: a photosensitive resin method), radiation-cured resin is poured between a relief die (die for copying a micro uneven pattern) and a flat substrate (plastic film), and hardened by radiation. Thereafter, the hardened film is separated together with the substrate from the die for duplication. The relief structure which has a high-definition micro uneven pattern can be obtained by this method. The relief structure obtained by this method provides a micro uneven pattern with a higher forming accuracy than the "pressing method" and the "cast method" which use thermoplastic resin, and is excellent in heat resistance or chemical resistance.

Further, as a method of preparing a relief forming layer having a novel relief structure, there is a method of molding with use of an optical curing resin which is solid or highly viscous at a normal temperature or a method of adding a mold release material.

Used as a material for the relief forming layer can be, for example: thermoplastic resin, such as acrylic-based resin, epoxy-based resin, cellulose-based resin, or vinyl-based resin; urethane resin of acrylic polyol or polyester polyol with a reactive hydroxyl group, added and bridged with polyisocyanate as a crosslinking agent; or theremosetting resin, such as a melamine-based resin, epoxy resin, or phenol-based resin or a compound thereof. Any other material than described can be used as long as a micro uneven pattern can be formed of the material.

Used as a material of the relief forming layer applicable to the photopolymer method described above can be, for example, a monomer, an oligomer, or a polymer, which has an ethylene unsaturated bond or an ethylene unsaturated group. Used as the monomer can be, for example, 1,6-hexane diol, neopentylglycol diacrylate, trimethylolpropane triacrylate, pentaerythritol triacrylate, pentaerythritol tetraacrylate, dipentaerythritol pentaacrylate, and dipentaerythritol hexaacrylate. The oligomer may be, for example, epoxy acrylate, urethane acrylate, or polyester acrylate. As the polymer, for example, urethane denaturation acrylic resin and epoxy denaturation acrylic resin can be used.

As a material of the relief forming layer using optical cationic polymerization can be used, for example, a monomer containing an epoxy group, an oligomer, a polymer, a compound containing an oxetane skeleton, or vinyl ethers can be used. When the ionizing radiation curing resin described above is hardened with light such as ultraviolet rays, a photo polymerization initiator can be added. Depending on the types of resin, an optical radical polymerization initiator, an optical cationic polymerization initiator, or a combination thereof (hybrid type) can be selected.

In addition, it is possible to use a mixture of a monomer, an oligomer, and a polymer, each of which has an ethylene unsaturated bond or an ethylene unsaturated group, to provide the mixture of these components with a reactive group in advance and to crosslink each other by an isocyanate compound, a silane coupling agent, an organic titanate crosslinker, an organic zirconium crosslinker, or an organic aluminate, and to provide the bridged components with a reactive group in advance and to bridge still another resin skeleton by an isocyanate compound, a silane coupling agent, an organic titanate crosslinker, an organic zirconium crosslinker, or organic aluminate. According to the method as described above, a polymer can be obtained which exists in solid form at a normal temperature, has good fabricability because of its lower tact, and leaves little dirt on an original plate, with use of polymer having an ethylene unsaturated bond or an ethylene unsaturated group.

Used as the optical radical polymerization initiator described above can be, for example: benzoin, or benzoin methyl ether, a benzoin-based compound, such as benzoin ethyl ether or anthraquinone, an anthraquinone-based compound, such as methyl anthraquinone or acetophenone; a phenyl-ketone-based compound, such as diethoxy acetophenone, benzophenone, hydroxy acetophenone, 1-hydroxy cyclohexyl phenyl ketone, alpha-amino acetophenone, 2-methyl-1-(4-methylthiophenyl)-2-morpholino-propane-1-ON, benzyl methyl ketal, thioxanthone, acyl phosphine oxide, or Michler's ketone.

Used as the optical cationic polymerization initiator in the case of using the compound described above capable of optical cationic polymerization can be, for example, an aromatic diazonium salt, an aromatic iodonium salt, an aromatic sulfonium salt, an aromatic phosphonium salt, or a mixed ligand metal salt. In the case of a so-called hybrid material which uses both optical radical polymerization and optical cationic polymerization, polymerization initiators of both polymerizations can be used in a mixture. In addition, it is possible to use an aromatic iodonium salt or an aromatic sulfonium salt, which can start both polymerizations with one type of initiator.

In a resin composite including a radiation-cured resin and a photo polymerization initiator, a mixing rate of the photo polymerization initiator may be appropriately selected although 0.1 to 15 mass % is used in general. The resin composite may be used together with a sensitizing dye in combination with a photo polymerization initiator. According to necessity, the resin composite may also include a dye, a pigment, various additives (a polymerization inhibitor, a leveling agent, an antifoaming agent, an anti-sagging agent, an adhesion improvement agent, a coated surface modifier, a plasticizer, a compound containing nitrogen), and a crosslinking agent (for example, epoxy resin). In addition, a non-reactive resin (including thermoplastic resin or thermosetting resin described above) may be added to improve fabricability.

In the manufacturing method described above, a material for a relief forming layer may be selected, in consideration of fluidity to some extent which allows molding, and considering that thermostability and chemical resistance desired by a coated film can be obtained after molding.

In a process of forming a relief forming layer, a coating method may be used. In that case, the material for a relief forming layer may be coated on the substrate. In particular, wet coating allows formation at low costs. A material diluted with a solvent may be coated and dried in the course of forming a relief forming layer, to adjust thickness.

The thickness of the relief forming layer is preferably set within, for example, a range of 0.1 to 10 μm. Though depending on the method of manufacturing the relief forming layer as described above, too great a thickness causes protrusions and wrinkles of resin due to the pressure during processing for transferring a relief structure. On the other hand, if too thin, fluidity at the time of transferring the relief structure may be insufficient to achieve molding. Though transfer properties of the micro uneven pattern change depending on the shape of the pattern, the thickness of the relief forming layer is preferably 1 to 10 times, or more preferably 3 to 5 times a desired depth of unevenness.

After the relief forming layer is brought into contact with an original relief plate having a desired relief structure, the shape of the original relief plate is transferred to one side of the relief forming layer by using heat, pressure, or microwaves. The relief structure may be formed not only on one side but also two sides, i.e., front and back surfaces of the relief forming layer.

A well-known method may be used as the method of manufacturing the original relief plate to be used. A rolled original plate allows continuous molding.

First Reflection Layer

The first reflection layer functions to reflect electromagnetic waves. In the case of reflecting light which has penetrated the relief forming layer and the relief structure with a micro uneven pattern, a higher refractive-index material than the refractive index of the substrate or the relief forming layer is used. In this case, the difference in refractive index between the first reflection layer and the relief forming layer is preferably 0.2 or more. By setting the difference in refractive index to be 0.2 or more, refraction and reflection occur at the interface between the relief forming layer and the first reflection layer. In addition, the first reflection layer which covers the relief structure may emphasize an optical effect created by the micro uneven structure.

Metal materials, such as Al, Sn, Cr, Ni, Cu, Au, and Ag, can be used singularly or in the form of a compound thereof, as a material for the first reflection layer.

The first reflection layer preferably has a transmittance of 40% or less. An interference color is generated by the three-layer interference film made of the first reflection layer, the functional thin film, and the second reflection layer. Therefore, the first reflection layer preferably has transparency and also preferably has a diffractive difference of 0.2 or more relative to the relief forming layer and the functional thin film layer, to cause reflection at both interfaces.

The first reflection layer which has such transparency can be realized by forming a thin film made of one or a compound of the metal materials described above.

Examples of materials other than described above, each of which can be used for the transparent first reflection layer, are cited below. Numerals in parentheses each indicate a refractive index n. Ceramics which can be used are, for example: $Sb_2O_3$ (3.0), $Fe_2O_3$ (2.7), $TiO_2$ (2.6), CdS (2.6), $CeO_2$ (2.3), ZnS (2.3), $PbCl_2$ (2.3), CdO (2.2), $Sb_2O_3$ (5.0), $WO_3$ (5.0), SiO (5.0), $Si_2O_3$ (2.5), $In_2O_3$ (2.0), PbO (2.6), $Ta_2O_3$ (2.4), ZnO (2.1), $ZrO_2$ (5.0), MgO (1.0), $SiO_2$ (1.45), $Si_2O_2$ (10), $MgF_2$ (4.0), $CeF_3$ (1.0), $CaF_2$ (1.3-1.4), $AlF_3$ (1.0), $Al_2O_3$ (1.0), and GaO (2.0). Organic polymers which can be used are, for example, polyethylene (1.51), polypropylene (1.49), polytetrafluoroethylene (1.35), polymethyl methacrylate (1.49), and polystyrene (1.60).

The first reflection layer needs resistance against an etching treatment agent used to perform a pattern processing on the second reflection layer in the manufacturing method described above. For example, the reflectance of the first reflection layer in a second area needs not to change due to dissolution, corrosion, deterioration, or separation but needs to be stable. Therefore, the first reflection layer may be appropriately selected from the materials described above. Depending on the case, a plurality of materials may be used.

Resistance against the etching treatment agent of the first reflection layer in the second area may be strengthened by the functional thin film layer arranged so as to cover the first reflection layer. That is, even if the first reflection layer has low resistance against the etching treatment agent, the reflection function of the first reflection layer in the second area can be prevented from deterioration by protecting the first reflection layer from the etching treatment agent by multi-layering with the functional thin film layer.

Since the first reflection layer is formed as a thin film with a uniform thickness on the micro uneven surface of the relief forming layer in the manufacturing method described above, a dry coating method, such as a vacuum deposition method, a sputtering method, or a CVD method, is preferably employed.

For the first reflection layer, it is possible to use a high-luminance optical reflection ink, an organic polymer, or fine particles of the organic polymer, which is obtained by dispersing micro powder, sol, or metal nano particles of the metals described above, ceramics, or an organic polymer. This first reflection layer can be formed by a well-known printing method, such as a gravure printing method, a flexo printing method, or a screen printing method. To provide the first reflection layer by such a printing method as described, adjustment may be performed so as to set the dried film thickness to 0.001 to 10 µm or so.

Functional Thin Film Layer

The functional thin film layer comprises a function to allow light, which has penetrated the substrate, the relief forming layer having a micro uneven pattern, and the first reflection layer, to further penetrate. Further, the functional thin film is a middle layer in the three-layer interference film since an interference color is caused by the three-layer interference film made of the first reflection layer, the functional thin film layer, and the second reflection layer. In general, the three-layer interference film is configured by a layered structure made of a high-refraction layer, a low-refraction layer, and a high-refraction layer. Therefore, the functional thin film as the middle layer preferably has a refractive index which is lower by 0.2 or more than refractive indices of the first and second reflection layers. By setting the difference in refractive index to be 0.2 or more, refraction and reflection can be caused at the interface between the relief forming layer and the first reflection layer.

In the second area, two layers of the first reflection layer and the functional thin film are layered. Therefore, an interference color is not obtained.

The functional thin film layer is the middle layer in the three-layer interference film made of the first reflection layer, the functional thin film layer, and the second reflection layer, and is therefore preferably a low-refraction film with a high transparency. Specifically, the functional thin film layer has a refractive index equal to or lower than the first reflection layer, and can cause reflection on both interfaces.

Examples of materials which can be used for the transparent functional thin film layer are cited below. Numerals in parentheses each indicate a refraction index n. Ceramics which can be used are, for example: $Sb_2O_3$ (3.0), $Fe_2O_3$ (2.7), $TiO_2$ (2.6), CdS (2.6), $CeO_2$ (2.3), ZnS (2.3), $PbCl_2$ (2.3), CdO (2.2), $Sb_2O_3$ (5.0), $WO_3$ (5.0), SiO (5.0), $Si_2O_3$ (2.5), $In_2O_3$ (2.0), PbO (2.6), $Ta_2O_3$ (2.4), ZnO (2.1), $ZrO_2$ (5.0), MgO (1.0), $SiO_2$ (1.45), $Si_2O_2$ (10), $MgF_2$ (4.0), $CeF_3$ (1.0), $CaF_2$ (1.3-1.4), $AlF_3$ (1.0), $Al_2O_3$ (1.0), and $GaO_2$ (2.0). Organic polymers which can be used are, for example, polyethylene (1.51), polypropylene (1.49), polytetrafluoroethylene (1.35), polymethyl methacrylate (1.49), and polystyrene (1.60).

The functional thin film layer is the middle layer of the three-layer interference film, and functions as a layer for adjusting an optical path difference, which controls an interference color. Therefore, the functional thin film can be formed to be thin with a uniform thickness along the micro uneven surface of the relief forming layer. Therefore, a gaseous phase method (dry coating method), such as a vacuum deposition method, a sputtering method, or a CVD method, is preferably employed to form the functional thin film.

Second Reflection Layer

The second reflection layer is provided along the relief structure, and reflects light which has penetrated the relief forming layer, the first reflection layer, and the functional thin film layer. For the second reflection layer, a material having a higher refractive index than that of the functional thin film is used. In this case, the difference in refractive index between both layers is preferably 0.2 or more. By setting the difference in refractive index to be 0.2 or more, refraction and reflection can be caused at the interface between the functional thin film and the second reflection layer.

For example, metal materials, such as Al, Sn, Cr, Ni, Cu, Au, and Ag, can be used in sole or in form of a compound thereof, as a material for the second reflection layer.

Examples of other materials than the metals and chemical compounds described above, which can be used for the transparent second reflection layer, are cited below. Numerals in parentheses each indicate a refraction index n. Ceramics which can be used are, for example: $Sb_2O_3$ (3.0), $Fe_2O_3$ (2.7), $TiO_2$ (2.6), CdS (2.6), $CeO_2$ (2.3), ZnS (2.3), $PbCl_2$ (2.3), CdO (2.2), $Sb_2O_3$ (5.0), $WO_3$ (5.0), SiO (5.0), $Si_2O_3$ (2.5), $In_2O_3$ (2.0), PbO (2.6), $Ta_2O_3$ (2.4), ZnO (2.1), $ZrO_2$ (5.0), MgO (1.0), $SiO_2$ (1.45), $Si_2O_2$ (10), $MgF_2$ (4.0), $CeF_3$ (1.0), $CaF_2$ (1.3-1.4), $AlF_3$ (1.0), $Al_2O_3$ (1.0), and $GaO_2$ (2.0). Organic polymers which can be used are, for example, polyethylene (1.51), polypropylene (1.49), polytetrafluoroethylene (1.35), polymethyl methacrylate (1.49), and polystyrene (1.60).

The second reflection layer may be appropriately selected among the foregoing materials in consideration of patterning by changing a reflectance or a transparency through dissolution, corrosion, or deterioration with an etching treatment agent, in accordance with the manufacturing method described above. Depending on the case, a plurality of materials may be used. When patterning the second reflection layer, it is preferable to select appropriately a material and a process which do not degrade the reflection effect of the first reflection layer.

A method of performing a wet etching treatment on the second reflection layer made of any of the metals or metal oxides described above can be adopted as a method of changing a reflectance or a transparency of the second reflection layer by dissolution. Well-known acids, alkalis, organic solvents, oxidizing agents, and reducing agents can be used for etching. Depending on materials of the second reflection layer, a dry etching method may be used. Also in such a patterning process of the second reflection layer as described above, only the second reflection layer is patterned, and the first reflection layer does not change.

As a method of changing the reflectance or transparency of the second reflection layer, for example, it is possible to employ a method of oxidizing a second reflection layer made of copper, by an oxidizing agent, to be changed into copper oxide, or a method of oxidizing a second reflection layer made of aluminum, by an oxidizing agent, to be changed into boehmite. Also in such a patterning process of the second reflection layer as described above, only the second reflection layer is patterned, and the first reflection layer does not change.

Apart from the method of changing a dissolution characteristic and a deterioration characteristic of the second reflection layer, it is also possible to change optical characteristics, such as a refractive index, a reflectance, or a transmittance, or a practical durability, such as weather resistance or interlayer tightness.

The second reflection layer is formed as a thin film with a uniform film thickness on a micro uneven surface of a relief forming layer in the manufacturing method described above. A dry coating method, such as a vacuum deposition method, a sputtering method, or a CVD method is preferably employed.

Protection Layer

The protection layer is light-transmissive and functions as a mask layer when forming the second reflection layer by patterning.

A material which has resistance to an etching treatment agent when etching the second reflection layer may be used for the material of the protection layer, and may be provided with such a film thickness that can ensure resistance. For example, when the protection layer is formed by wet coating such as printing, for example, thermoplastic resin, thermosetting resin, moisture curing resin, ultraviolet curing resin, or electron-beam curing resin can be used. Specifically, acrylic resin, polyester resin, or polyamide imide resin can be used. Further, a lubricant, e.g., wax such as polyethylene powder or carnaba wax may be added. The lubricant can be added up to a quantity of 20 parts by weight to an extent of not being clouded. Such resin can be diluted with a solvent to an adequate viscosity and can then be applied to wet coating. On the other hand, when the protection layer is formed by dry coating, e.g., a transparent inorganic material such as silica or alumina can be used. Photosensitive resin can be used as a material other than those described above.

The protection layer of the forgery prevention structure shown in FIG. 1 is preferably formed by the wet coating described above.

As a method of forming a pattern for the second reflection layer using a protection layer, a method of forming a pattern by changing the reflectance or transparency of the second reflection layer by dissolution, corrosion, or deterioration, as described above, can be employed.

Typically, wet etching or dry etching is assumed, and in such a pattern forming method as described above, a protection layer may be formed in a patterned part of the second reflection layer in a part to remain.

In the above, layers which form the forgery prevention structure according to the first embodiment have been described specifically. However, a reflection film may be provided on the outermost surface in order to improve optical characteristics. The surface protection film or reflection film can be provided by using a well-known coating method.

In order to improve interlayer sealing tightness, a corona treatment, a frame treatment, a plasma treatment, and primer painting may be performed. In order to improve optical characteristics, an antireflection treatment may be performed on the outermost layer.

To further improve the design, a multilayer interference film may be formed by coloring a layer or by configuring the reflection layer in a multilayer configuration.

Next, a modification of the forgery prevention structure according to the first embodiment will now be described with reference to FIG. 3 and FIG. 4. The same members as in FIG. 1 described above will be denoted at the same reference signs, and descriptions thereof will be omitted herefrom.

FIG. 3 is a sectional view showing a forgery prevention sticker. The forgery prevention structure 21 comprises a substrate 22, a relief forming layer 2, a first reflection layer 3, a functional thin film layer 4, a second reflection layer 5, a protection layer 6, and an adhesion layer 23, which are layered in this order.

The forgery cancellation sticker 21 configured as described above is used when transferring the relief forming layer 2, the first reflection layer 3, the functional thin film layer 4, the second reflection layer 5, and the protection layer 6 to another substrate (transfer target), and the adhesion layer 23 is used for adhesion to yet another substrate. After transfer, the substrate 21 may be separated.

By using such a forgery prevention sticker 21 as described above, a forgery prevention medium to which the forgery prevention structure is adhered can be obtained.

FIG. 4 is a sectional view showing a forgery prevention transfer foil. A forgery prevention transfer foil 31 has a structure in which a separable substrate 32, a relief forming layer 2, a first reflection layer 3, a functional thin film layer 4, a second reflection layer 5, a protection layer 6, and an adhesion layer 33 are layered in this order.

By pressing a heat medium such as a heat roll or a heat plate to the substrate 32 and by heating the medium to a transfer temperature, the adhesion layer of the forgery prevention transfer foil 31 is pressed in contact with another substrate as a transfer target. Simultaneously, the substrate 32 is separated at the interface between the substrate 32 and the relief forming layer 2.

By using such a forgery prevention transfer foil 31 as described above, the forgery prevention medium in which the forgery prevention structure is adhered to the transfer target can be obtained.

In the foregoing forgery prevention structures in FIG. 3 and FIG. 4, a separation protection layer may be provided between the substrate and the relief forming layer, if needed. The separation protection layer is for achieving a smooth and stable separation from the substrate. Therefore, the separation protection layer is made of a material with a good mold-release characteristic relative to the substrate.

The substrate used for the forgery prevention sticker and forgery prevention transfer foil is preferably a film substrate, as described above. As the film substrate, a material which is less deformed or degraded by heat, pressure, and electromagnetic waves, which are applied during formation of a micro uneven pattern (relief structure), is used. A film made of plastic, such as PET (polyethylene terephthalate), PEN (polyethylenenaphthalate), or PP (polypropylene), may be used for the film substrate. Depending on the need, a paper made of multiple plastic layers or a paper impregnated with resin may be used as a substrate.

Second Embodiment

FIG. 5 is a sectional view showing a forgery prevention structure according to the second embodiment.

A forgery prevention structure 41 comprises a relief forming layer 42, a first reflection layer 43, a functional thin film layer 44, a second reflection layer 45, and a protection layer 46, which are layered in this order. One side of the relief forming layer 42 has a relief structure comprising a first relief 47 and a second relief 48 with a micro uneven pattern which performs an effect of diffracting, scattering, absorbing, and polarizing/separating a wavelength range of at least a part of visible light. The surface of the first relief 47 has a smaller uneven surface area in comparison with the surface of the second relief 48. That is, the first relief 47 has gentle concave and convex parts, and there are wide intervals between the concave and convex parts. On the other hand, the second relief 48 has a shape with steeper concave and convex parts in comparison with the first relief 47, and intervals between the concave and convex parts are smaller in comparison with the first relief 47.

The first reflection layer 43 and the functional thin film layer 44 are provided along the micro uneven surface of the relief structure 7 (the first and second reliefs 47 and 48). The second reflection layer 45 and the protection layer 46 are provided so as to cover only the surface of the functional thin film layer 44 of the first relief 47.

That is, in the first area 49, the first reflection layer 43, the functional thin film layer 44, the second reflection layer 45, and the protection layer 46 are layered in this order on the uneven surface of the relief forming layer 42. A colored reflection layer is obtained which causes at least a partial range of visible light to interfere, through three layers of the first reflection layer 43, the functional thin film layer 44, and the second reflection layer 45. The three layers allow a relief structure to be designed to be capable of forming a reflection layer which causes a color tone to change in accordance with the angle of view and a vivid-color reflection layer.

The colored reflection layer exists only in the first area 49, and only the patterned second reflection layer 45 is colored. In the first area 49, the patterned second reflection layer 45 is colored in itself. As a result, the second reflection layer 45 is a colored pattern in itself, and therefore, a coloring ink is patterned and printed. Accordingly, it is possible to avoid positional misalignment between a colored pattern and a reflection layer in the conventional method of forming the reflection layer in alignment with the colored pattern.

The second area 50 is an area where only the first reflection layer 43 and the functional thin film layer 44 are layered on the micro uneven surface of the second relief 48 of the relief forming layer 42 and where neither the second reflection layer 45 nor the protection layer 46 exist. Therefore, also in the second area 50, a colorless optical effect owing to a relief structure can be obtained.

In addition, the first area 49 and the second area 50 have different relief structures (the first area 49: the first relief 47, the second area 50: the second relief 48, and the uneven surface area: the first relief 47 surface<the second relief 48 surface). For example, both structures are reliefs of diffraction gratings and therefore have different uneven surface areas. Accordingly, both structures exhibit different color change effects.

Further, in the forgery prevention structure 41, a boundary between the first area 49 and the second area 50 is a boundary between different relief structures. Therefore, there is no positional misalignment among the pattern of the second reflection layer 45, the colored pattern, and the pattern (first relief 47) of the relief structure of the first area 49.

Therefore, in the forgery prevention structure according to the second embodiment, a more precise and complex optical effect can achieve a high forgery prevention effect by the colored reflection relief structure in the first area 49, the colorless reflection relief structure in the second area 50, or different color change effects between the second areas 40 and 50. A much higher forgery prevention effect can be exhibited.

Next, a method of manufacturing a forgery prevention structure according to the second embodiment will be described.

First Process

A relief forming layer is formed on the whole surface of a substrate. The relief forming layer can be formed by coating, e.g., by wet coating on the substrate. In addition, the substrate may serve as a relief forming layer in itself.

Next, an original relief plate made of a metal or resin and having an uneven shape is prepared. The uneven shape of the original relief plate is transferred to a surface of the relief forming layer, to form a relief structure comprising first and second reliefs having an uneven surface in the relief forming layer. The surface of the first relief has a smaller uneven surface area in comparison with the surface of the second relief. That is, intervals between concave and convex parts of the first relief are wider than those of the second relief.

The method of transferring the shape may be a well-known method described in the first embodiment, such as a press method, a casting method, or a photopolymer method, or a hybrid method which combines these methods.

Second Process

On the surface of the relief structure of the reflection forming layer, a first reflection layer, a functional thin film layer, and a thin film layer for a second reflection layer are formed in this order.

The first reflection layer and the functional thin film layer can be formed by well-known wet coating or dry coating. The thin film layer for the second reflection layer can be formed by dry coating, preferably.

Third Process

A protection layer which functions as an etching mask is formed on the thin film layer for the second reflection layer. Subsequently, the thin film layer for the second reflection layer is selectively removed by etching with an etching treatment agent, with the protection layer used as a mask, to form the second reflection layer. That is, the thin film layer for the second reflection layer is left to remain in an area under the area (first area 49) of the protection layer, to form the second reflection film 5. The thin film layer for the second reflection layer is removed from under the other areas (second area 50). Here, the first reflection layer need not be removed by etching.

The forgery prevention structure according to the second embodiment is manufactured through the first to third processes described above, though is not limited thereto.

The patterned protection layer and second reflection film can be formed by another method, as follows. This method will now be described with reference to FIG. 6. After forming a thin film layer 51 for a second reflection layer on the whole surface of a functional thin film layer 44 by a gaseous phase method, such as a vacuum deposition method or a sputtering method, a protection layer 46 is formed on the whole surface also by a gaseous phase method, such as a vacuum deposition method or a sputtering method. At this time, a relief structure of a relief forming layer 42 comprises a first relief 47 and a second relief 48 having a shorter interval between concave and convex parts than the relief 47, as shown in FIG. 6. Therefore, the thin film layer 51 for the second reflection layer and the protection layer 46 are formed with a sufficient thickness in the first area 49, and are formed thinly only at tip ends of convex parts of the uneven shape in the second area 50 where the second relief 48 is present. Therefore, when a subsequent etching treatment is performed on the whole surface, the protection layer 46 and the thin film layer 51 for the second reflection layer which are formed thinly only at tip ends of convex parts of the uneven shape in the second area 50 are removed by etching preferentially. The thin film layer 51 for the second reflection layer (which functions as the second reflection layer 45) and the protection layer 46 remain only in the first area 49, thereby forming a pattern.

A transparent inorganic material such as silica or alumina is used as a material of the protection layer 46 described above.

According to the method as described above, the second reflection layer 45 (and protection layer 46) can be formed on the first relief (first area) in accordance with shapes of the preset first and second reliefs 47 and 48. Therefore, coloring can be effected only in the first area, and optical effects of different reliefs in the first and second areas can be obtained.

Materials and required characteristics of individual layers forming the forgery prevention structure according to the second embodiment are the same as those described in the first embodiment.

Alternatively, the forgery prevention structure according to the second embodiment may be modified as shown in FIG. 3 (forgery prevention sticker) and FIG. 4 (forgery prevention transfer foil). By using such a forgery prevention sticker or a forgery prevention transfer foil, a forgery prevention medium to which the forgery prevention structure is adhered can be obtained.

Hereinafter, Examples of the invention will be described.

Example 1

Example 1 will be described with reference to a configuration of FIG. 3 as a typical example. An ink made of a composite described below was applied to a substrate 11 made of a 25-μm-thick transparent polyethylene terephthalate (PET) film to obtain a film thickness of 2 μm after drying. The ink was then dried to form the relief forming layer 2. Subsequently, a relief pattern of a diffraction grating was formed on the surface of the relief forming layer 2 by a roll embossing method. A first reflection layer 3 having a film thickness of 50 nm was formed along the relief pattern by performing vacuum deposition of titanium oxide (TiO2) to the relief forming layer 2. Further, a functional thin film layer 4 having a 130 nm film thickness was formed on the first reflection layer 3 by performing vacuum deposition of silica (SiO2). Subsequently, an aluminum layer having a film thickness of 50 nm was formed on the functional thin film layer 4 by performing vacuum deposition of aluminum. Subsequently, an ink made of a composite described below was printed on the aluminum layer to form a protection layer 6 having a star pattern. The thickness of the protection layer 6 was 1 μm as a dry film thickness. Thereafter, a second reflection layer 5 having a star pattern was formed by etching an aluminum layer part which was exposed by performing an alkaline etching treatment with the protection layer 6 used as an etching mask. Thereafter, an ink made of a composite described below was printed on the functional thin film 4 including the protection layer 6 by a gravure printing method, and was dried to form an adhesion layer 23 having a film thickness of 3 μm, to obtain a forgery prevention sticker 21.

| Relief forming-layer ink composite" | |
|---|---|
| Acrylic resin | 20.0 weight part |
| Methyl ethyl ketone | 50.0 weight part |
| Ethyl acetate | 30.0 weight part |

| "Protection layer ink composite" | |
|---|---|
| Polyamide resin | 20.0 weight part |
| Ethanol | 50.0 weight part |
| Toluene | 30.0 weight part |
| "Adhesion layer ink composite" | |
| Acrylics adhesive | 50 weight part |
| Silica | 10 weight part |
| Methyl ethyl ketone | 40 weight part |

Comparative Example 1

As shown in FIG. 7A, an ink made of a composite described below was printed on a substrate 101, to form a colored layer 102 having a star pattern. Subsequently, a relief forming layer 103 was formed on the substrate 101 including the colored layer 102 by the same method as in Example 1. The relief structure 104 which had micro unevenness on one side of the relief forming layer 103 was formed. Subsequently, an aluminum layer having a film thickness of 50 nm was formed on the relief forming layer 103 by performing vacuum deposition of aluminum. Subsequently, a protection layer ink composite which is the same as that in Example 1 was printed on the aluminum layer, to form a protection layer 105 having a star pattern. The thickness of the protection layer 105 was 1 μm as a dry film thickness. Subsequently, a second reflection layer 106 was formed by etching an aluminum layer part which was exposed by performing an alkaline etching treatment with the protection layer 105 used as an etching mask (see FIG. 7B). Thereafter, the same adhesion layer ink composite as in Example 1 was printed on the functional forming layer including the protection layer by a gravure printing method, and was dried to form an adhesion layer having a film thickness of 3 μm, to thereby obtain a forgery prevention sticker.

Between the colored layer of the star pattern and the protection layer of the star pattern, matching was performed as much as possible by overprinting (overlay registration printing).

| "Pattern colored layer ink composite" | |
|---|---|
| Urethane printing ink/yellow | 50.0 weight parts |
| Methyl ethyl ketone | 25.0 weight parts |
| Ethyl acetate | 25.0 weight parts |

Forgery prevention was evaluated for the forgery prevention stickers according to Example 1 and Comparative Example 1.

Evaluation of Forgery Prevention Characteristics

After taking an enlarged photograph by a microscope, an area ratio was evaluated between the "colored reflection layer area" and the "reflection layer area (the area of the second reflection layer in Example 1 and the area of the reflection layer in Comparative Example 1)" (colored reflection layer area mm$^2$/reflection layer area mm$^2$ (the area of the second reflection layer in Example 1 and the area of the reflection layer in Comparative Example 1)). After taking an enlarged photograph by a microscope, photograph image analysis was conducted, and a positional misalignment width (mm) between the "area of the colored reflection layer" and the "area of the second reflection layer" was measured.

The area ratio (mm²/mm²) and the positional misalignment width (mm) each were measured at 20 portions, and averaged values and maximum values were obtained for the ratio and width.

The following table 1 shows results thereof.

TABLE 1

|  | Example 1 | Comparative Example 1 |
|---|---|---|
| Area ratio of colored layer/reflection layer. Averaged values (n = 20) | 1.00 | 1.00 |
| Area ratio of colored layer/reflection layer. Maximum values (n = 20) | 1.00 | 1.02 |
| Positional misalignment between colored layer & reflection layer. Averaged values (n = 20) | 0.00 mm | 0.76 mm |
| Positional misalignment between colored layer & reflection layer. Maximum values (n = 20) | 0.00 mm | 1.00 mm |

As is apparent from Table 1, the forgery prevention structure according to Example 1 achieves an excellent area ratio of 1.00 and positional misalignment of 0.00 mm (less than 0.01 mm below the limit of measurement). In contrast, the forgery prevention structure according to Comparative Example 1 achieves an area ratio of 1.02 and causes positional misalignment of 1.00 mm at maximum.

Through visual observation of the forgery prevention structure according to Comparative Example 1, misalignment of the coloring layer relative to a reflection layer was checked.

INDUSTRIAL APPLICABILITY

According to the present invention, a forgery prevention structure with high design quality and high security can be provided with a reflection layer of a desired color tone and an arbitrary pattern, and a forgery prevention structure which is excellent in design and/or security can be provided. Hence, applications to valuable papers, brand-name products, certificates, and personal authentication media are available.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A forgery prevention structure comprising:
a relief forming layer, a first reflection layer, a functional thin film layer, a second reflection layer and a protection layer in this order, wherein
the relief forming layer has, on one side, a relief structure comprising a first relief and a second relief, each of the first relief and the second relief performing an effect of diffracting, scattering, absorbing, or polarizing/separating a wavelength range of at least a part of visible light,
each of the first and second reliefs has an uneven surface, a surface area of the uneven surface of the first relief being smaller than a surface area of the uneven surface of the second relief,
the first relief has concave and convex parts and the second relief has concave and convex parts, and intervals of the concave and convex parts of the second relief are smaller than intervals of the concave and convex parts of the first relief,
the first reflection layer and the functional thin film layer each are provided along a whole of the uneven surfaces of the first and second reliefs and each has uneven surfaces corresponding respectively to the uneven surfaces of the first and second reliefs,
the second reflection layer and the protection layer each cover only a surface of the functional thin film layer of the first relief and each has an uneven surface corresponding to the uneven surface of the first relief,
three layers of the first reflection layer, the functional thin film layer, and the second reflection layer cause at least a partial range of visible light to interfere, and
the relief forming layer, the first reflection layer, the functional thin film layer, the second reflection layer, and the protection layer layered in this order have transparency.

2. The forgery prevention structure according to claim 1, wherein the first reflection layer includes at least one selected from a group of tantalum oxide, niobium oxide, titanium oxide, indium oxide tin, zirconium oxide, cerium oxide, and hafnium oxide.

3. The forgery prevention structure according to claim 2, wherein an adhesion layer is layered on both of the functional thin film layer of the second relief and the protection layer of the first relief to provide the forgery prevention structure with a sticker configuration.

4. The forgery prevention structure according to claim 2, wherein
at least a separate substrate is provided, on which at least the relief forming layer, the first reflection layer, the functional thin film of the first and second reliefs, and the second reflection layer and the protection layer of the first relief are layered, and
an adhesion layer is layered on both the functional thin film layer of the second relief and the protection layer of the first relief to provide the forgery prevention structure with a transfer foil configuration which can be separated from the substrate.

5. The forgery prevention structure according to claim 1, wherein the first reflection layer is formed by a high-luminance transparent reflection painting material, which is made of high refraction particles.

6. The forgery prevention structure according to claim 5, wherein an adhesion layer is layered on both of the functional thin film layer of the second relief and the protection layer of the first relief to provide the forgery prevention structure with a sticker configuration.

7. The forgery prevention structure according to claim 5, wherein
at least a separate substrate is provided, on which at least the relief forming layer, the first reflection layer, the functional thin film of the first and second reliefs, and the second reflection layer and the protection layer of the first relief are layered, and
an adhesion layer is layered on both the functional thin film layer of the second relief and the protection layer of the first relief to provide the forgery prevention structure with a transfer foil configuration which can be separated from the substrate.

8. The forgery prevention structure according to claim 1, wherein an adhesion layer is layered on both of the functional thin film layer of the second relief and the protection layer of the first relief to provide the forgery prevention structure with a sticker configuration.

9. The forgery prevention structure according to claim 1, wherein
- at least a separate substrate is provided, on which at least the relief forming layer, the first reflection layer, the functional thin film of the first and second reliefs, and the second reflection layer and the protection layer of the first relief are layered, and
- an adhesion layer is layered on both the functional thin film layer of the second relief and the protection layer of the first relief to provide the forgery prevention structure with a transfer foil configuration which can be separated from the substrate.

* * * * *